United States Patent Office 3,113,157
Patented Dec. 3, 1963

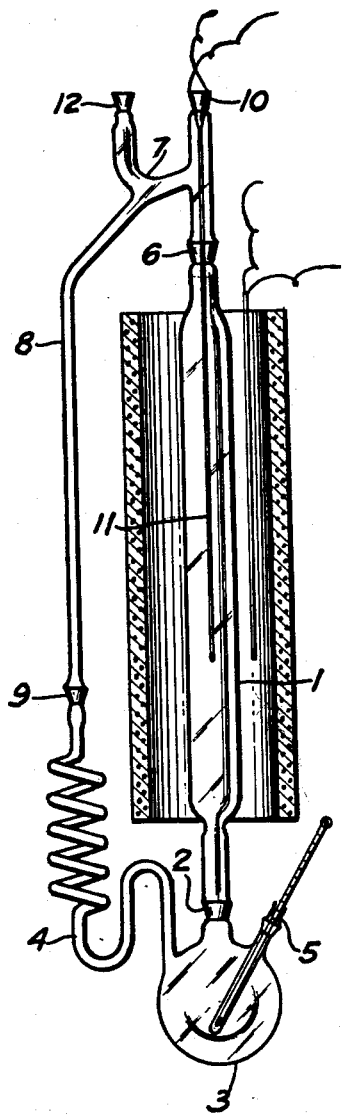
INVENTOR
JOHANNES DAHMLOS
ATTORNEYS

3,113,157
PROCESS FOR THE PREPARATION OF CHLORO-
FLUORO DERIVATIVES OF ALIPHATIC HYDRO-
CARBONS
Johannes Dahmlos, Haltern, Westphalia, Germany, assignor to Wasag-Chemie Aktiengesellschaft, Essen, Germany
Filed Oct. 19, 1960, Ser. No. 63,614
Claims priority, application Germany Oct. 20, 1959
3 Claims. (Cl. 260—653.8)

This invention relates to a process for the preparation of chlorofluoro derivatives of aliphatic hydrocarbons.

Halogenated hydrocarbons containing one or more fluorine atoms are widely used as refrigerants and propellants, and consequently, it is highly desirable to produce these compounds by an economical and simple process.

To achieve these aims, several processes have been suggested. One of these encompasses the reaction of chlorinated hydrocarbons with sodium, barium or potassium silicofluorides at 250–300° C. under super atmospheric pressure in an autoclave capable of withstanding high pressures. The use of super atmospheric pressure conditions is necessitated by the fact that the rate of halogen exchange is satisfactory only at temperatures substantially above the boiling point of the fluorine-free chlorinated compounds (e.g. carbon tetrachloride, perchloroethane and chloroform) which are used as the reactants. In order to keep this process within safe limits, it is necessary to compromise the pressure conditions from a safety standpoint and equipment standpoint, with the pressure conditions permitting a higher rate of reaction. It is obvious to a chemical engineer that the employment of pressure in a process treating compounds containing fluorine atoms, and in addition halogenated hydrocarbons, makes this process both potentially dangerous from the standpoint of fluoride ion corrosion, and hazardous due to the possibility of the leakage of the toxic halogenated hydrocarbons. Of course, on the other hand, it is realized that it is possible to design equipment for a high pressure process, but the equipment involved is comparatively expensive, and consequently, the investment costs necessary for a high pressure plant significantly contribute to the ultimate cost of the final product.

An object of the present invention, therefore, is to provide a process which is not burdened by the expense of the necessary equipment for high pressure conditions.

Another object is to provide a process having a less hazardous operation when used with fluorine-containing compounds and volatile halogenated hydrocarbons.

A further object of the present invention is to increase the rate of halogen exchange over that of the prior art processes.

These and other objects and advantages of the present invention will become apparent upon further study of the specification and appended claims.

To attain the objects and advantages of the present invention, it is necessary to employ the following process which is illustrated by the attached drawing wherein:
FIGURE 1 is a schematic elevation of laboratory apparatus.

The process of this invention comprises the steps of: vaporizing a chlorinated aliphatic hydrocarbon at below super atmospheric pressures to obtain vapors of chlorinated aliphatic hydrocarbons; superheating said vapors to above 300° C. at below super atmospheric pressures and contacting the superheated vapors with either sodium, barium or potassium silico fluorides at below super atmospheric pressures, thereby replacing at least one of the chlorine atoms with a fluorine atom, thus forming a chlorofluoro aliphatic hydrocarbon; and separating this latter compound from the remaining reactants and products.

For a more specific embodiment of this invention, reference is made to FIGURE 1, wherein a vertical elongated glass tube 1, 60 cm. in length and 5 cm. in diameter, is used as a reaction chamber, and is supplied with a silicofluoride of either sodium, potassium or barium. The tube is tapered at the bottom and extends into a tube of narrower diameter having affixed at its terminal portion thereon, a ground glass connection 2 which is insertable into flask 3. The flask 3 is provided with a thermometer well 5 and overflow tube 4.

At the upper portion of the elongated reaction chamber 1, is a Y-shaped adapter 7 which is affixed to the terminal portion of the reaction tube by means of ground glass connection 6. To adapter 7 is also connected the overflow pipe 4 by means of pipe 8 and ground glass connection 9.

At the upper portion of the adapter 7 is inserted thermocouple well 11 by means of ground glass connection 10.

At the upper portion of the small leg of the Y-shaped adapter 7 is a ground glass connection 12 which is connected to a packed column (not shown on the drawing), and above said column, a reflux condenser (also not shown on the drawing). Two cold temperature traps (not shown on the drawing) are connected to the reflux condenser, the first trap being cooled by means of ice, and the second one by means of solid carbon dioxide. Attached to the traps is an absorption column which absorbs evolved silicon tetrafluoride. Still another trap cooled by Dry Ice is connected to the absorber, said trap being terminated by a drying tube which prevents any moisture from entering the apparatus.

It is also to be noted that reaction chamber 1 is heated in the electric oven surrounding the chamber.

In operation, the reaction tube is supplied with 1230 g. of dry granulated sodium silicofluoride, having a particle size of about 2–8 mm. The reaction tube is then heated to 500° C. To the flask are added 1400 g. carbon tetrachloride which is then brought to a gently boiling temperature. When the carbon tetrachloride vapor enters the reaction chamber, the reaction immediately proceeds by having a chloride atom or atoms replaced by fluoride atoms with the concomitant formation of silicon tetrafluoride. Upon emerging from the reaction chamber, the gaseous mixture passes through the packed column and the reflux condenser. The unreacted carbon tetrachloride vapor is substantially condensed in the reflux condenser and is then returned to the flask through the overflow tube. The chlorofluorinated reaction product is collected in the cooled traps; and the liberated silicon tetrafluoride is absorbed in the absorption column by means of water which transforms the absorbed material into silica and fluosilicic acid. The reaction is continued for about ten hours until there is no evidence of the liberation of silicon tetrafluoride from the reaction chamber. At the completion of the reaction, about 845 g. of liquid condensate is collected in the cooled traps. This reaction product is washed with a 15% aqueous solution of potassium hydroxide. This washed product is then fractionally distilled and dried, thereby yielding about 612 g. of trichlorofluoro methane ($CFCl_3$) and about 150 g. of carbon tetrachloride.

Upon examination of the reaction tube, it is found to contain 1022 g. of a salt mixture. This mixture is then treated with water to dissolve 321 g. of soduim chloride, thereby leaving 701 g. of unconverted sodium silicofluoride. It is seen, therefore, that of the 1230 g. of initial sodium silicofluoride, 521 g. (43%) are converted.

In the water absorber, about 303 g. of silicon tetrafluoride are collected in the form of silica and fluosilicic acid. By separating the fluosilicic acid and adding it to the aqueous sodium chloride solution obtained in the treatment of the residue in the reaction chamber, and with the addition of makeup sodium chloride, the fluosilicic acid is precipitated in the form of sodium fluosilicic acid which, after washing and drying, yields 320 g. of sodium silicofluoride. Consequently, 701 g. plus 320 g. of sodium silicofluoride are reclaimed. The overall fluorine efficiency is derived from the fact that 209 g. of sodium silicofluoride are consumed and about 612 g. of trichlorofluoro methane are formed. The fluorine efficiency is 67%.

In another experiment conducted with the same apparatus, barium silicofluoride was maintained as the fluorinating agent, and carobn tetrachloride vapor is passed over this salt at 350° C. for five hours. Obtained as the final products are about 550 g. of trichlorofluoro methane and 18 g. of dichlorodifluoro methane.

Of the sodium, barium and potassium silicofluorides that can be used in this reaction, it is preferable to use the sodium silicofluoride.

By means of the present invention, it is thus possible to produce chlorofluoro derivatives of aliphatic hydrocarbons without the utilization of high pressures. Of course, even in the present invention, as illustrated by FIGURE 1, there may be a few inches of water pressure build-up in the reaction chamber because of the resistances to flow presented by the packed column and the various traps. However, these minor pressure build-ups are not to be construed as being in the realm of super atmospheric pressures as defined by this invention. Thus, it will be seen that the present invention encompasses the use of pressures less than super atmospheric or, in other words, substantially atmospheric or less. It is also to be specifically noted that the present invention can be conducted at much less than substantially atmospheric pressures, by the employment of vacuum pumps, etc. As a matter of fact, the utilization of vacuum equipment may be very beneficial in some cases because the products of the reaction contain more mols of gas than do the reactants. The temperature of the reaction, at least above 300° C., is dependent to a large extent on the silicofluoride that is utilized. For example, when carbon tetrachloride is utilized as a reactant, excellent results are obtained with sodium and potassium silicofluorides when the reaction is conducted at about 500° C. In contrast, when a barium silicofluoride is employed, the reaction temperature can be as low as 350° C. In general, therefore, it is preferable to employ the sodium and potassium fluorides at 500° C. and the barium silicofluoride at 350° C.

This invention can be used for the conversion of chlorinated aliphatic hydrocarbons having from 1 to 4 carbon atoms, preferably from 1 to 3 carbon atoms. Furthermore, all of the hydrogens of the hydrocarbons can be replaced by chloride atoms, but obviously, at least two hydrogens must be replaced by chloride atoms in order for a chlorofluoro derivative to be formed. In general, it is preferable that from 3 to all of the hydrogen atoms be replaced by a chloride atom.

It will be understood that the invention is susceptible to modification in order to adapt it to different usages and conditions. For example, it is obvious to a skilled chemist that mixtures of aliphatic chlorinated hydrocarbons, as well as mixtures of silicofluoride salts, can be used as reactants. Furthermore, it is obvious that other silicofluorides, such as lithium silicofluoride, may be operable. Accordingly, it is desired to comprehend such modifications within the invention as may fall within the scope of the appended claims.

What I claim is:

1. A method for the production of chlorofluoro derivatives of an aliphatic hydrocarbon having from 1 to about 4 carbon atoms and having from about 3 to all of the hydrogen atoms of said hydrocarbon replaced by chlorine atoms, comprising the steps of: vaporizing said aliphatic hydrocarbon at below super atmospheric pressures; heating the resulting vapors to above 300° C.; contacting said heated vapors with a silicofluoride selected from the group consisting of sodium, potassium and barium silicofluorides at from above 300° C. to about 500° C. and below super atmospheric pressure to convert said aliphatic hydrocarbon to a chlorofluoro derivative of said hydrocarbon and to form silicon tetrafluoride; condensing and separating said chlorofluoro derivative; absorbing said silicon tetrafluoride in water to form silica and a solution of fluosilicic acid; separating said fluosilicic acid solution from the silica; adding to said fluosilicic acid solution a chloride salt having a cation corresponding to the cation of the silicofluoride salt used in the formation of the chlorofluoro derivative, thereby precipitating the silicofluoride salt from the solution; separating said silicofluoride salt and recycling it to the reaction for the formation of additional chlorofluoro derivatives.

2. The method of claim 1, wherein the aliphatic hydrocarbon is carbon tetrachloride, the silicofluoride is sodium silicofluoride, and the reaction is conducted at 500° C.

3. The method of claim 1, wherein the aliphatic hydrocarbon is carbon tetrachloride, the silicofluoride is barium silicofluoride and the reaction is conducted at about 350° C.

References Cited in the file of this patent

UNITED STATES PATENTS 2,924,624     Forshey _____ Feb. 9, 1960

FOREIGN PATENTS

3141/31     Australia _____ July 20, 1931
1,190,698     France _____ Oct. 14, 1959